United States Patent
Fan et al.

(10) Patent No.: US 6,181,813 B1
(45) Date of Patent: *Jan. 30, 2001

(54) METHOD FOR COUNTERFEIT CURRENCY DETECTION USING ORTHOGONAL LINE COMPARISON

(75) Inventors: Zhigang Fan, Webster, NY (US); John W. Wu, Rancho Palos Verdes, CA (US); Felice A. Micco, Grand Island, NY (US); Mike C. Chen, Cerritos; Kien A. Phong, Anaheim, both of CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/940,413

(22) Filed: Sep. 29, 1997

(51) Int. Cl.$^7$ .................................................. G06K 9/00
(52) U.S. Cl. .......................... 382/135; 382/199; 382/219; 382/289
(58) Field of Search .................................. 382/135, 137, 382/199, 209, 217, 219, 266, 276, 289, 291

(56) References Cited

U.S. PATENT DOCUMENTS

| | | | |
|---|---|---|---|
| 4,153,897 | 5/1979 | Yasuda et al. | 340/146.3 Q |
| 4,594,674 | * 6/1986 | Boulia et al. | 364/523 |
| 4,922,543 | 5/1990 | Ahlbom et al. | 382/48 |
| 5,216,724 | 6/1993 | Suzuki et al. | 382/7 |
| 5,220,398 | 6/1993 | Horn et al. | 356/152 |
| 5,253,765 | 10/1993 | Moorehead et al. | 209/539 |
| 5,287,415 | * 2/1994 | Chefalas et al. | 382/187 |

(List continued on next page.)

OTHER PUBLICATIONS

An article by A. Rosefield and A.C. Kak entitled "Digial Picture Processing", Academic Press, Inc.

"Invariant Fitting of Planar Objects by Primitives," published in 1996 IEEE Proceedings of ICPR '96, pp. 508–512 Voss et al.

"Managing and Representing Image Workflow in Prepress Applications," Technical Association of the Graphic Arts (TAGA) vol. 1, 1995 Proceedings, pp. 737–785, Venable et al.

*Primary Examiner*—Matthew C. Bella
*Assistant Examiner*—Sheela Chawan

(57) ABSTRACT

An anti-counterfeit currency detection method is disclosed wherein local edge information is utilized for accurately detecting lines and curves of legitimate notes. The method can more accurately determine the location and orientation of a pattern and thus provides more reliable currency detection. A detector is trained off-line with example notes resulting in a stored template generated by recording a test pattern similar to a pattern to be tested; anchor lines are identified within said template which are further represented in subsequent test patterns. The template is rotated and shifted before matching it to the test pattern so that anchor lines align with long lines detected within the test pattern. The template and test pattern are then compared to determine whether there is a match. The system comprises a microprocessor is programmed to facilitate the training of a detector off-line with example notes which are scanned into said system wherein a template is generated by recording an image pattern of said example notes similar to a test pattern to be detected. The microprocessor identifies anchor lines within the template which are further represented in said test pattern; rotates and shifts the template before matching it to the test pattern so that anchor lines align with lines which may be detected within said test pattern; and compares the template to the test pattern to determine whether said anchor lines exist within said test pattern.

10 Claims, 2 Drawing Sheets

U.S. PATENT DOCUMENTS

| | | | |
|---|---|---|---|
| 5,291,243 | 3/1994 | Heckman et al. | 355/201 |
| 5,363,949 * | 11/1994 | Matsubayashi | 382/209 |
| 5,430,525 | 7/1995 | Ohta et al. | 355/201 |
| 5,437,897 | 8/1995 | Tanaka et al. | 428/29 |
| 5,528,387 | 6/1996 | Kelly et al. | 358/488 |
| 5,530,772 * | 6/1996 | Storey | 382/135 |
| 5,533,144 * | 7/1996 | Fan | 382/135 |
| 5,557,412 | 9/1996 | Saito et al. | 358/296 |
| 5,652,803 | 7/1997 | Tachikawa et al. | 382/135 |
| 5,659,628 | 8/1997 | Tachikawa et al. | 382/135 |
| 5,678,155 | 10/1997 | Miyaza | 399/366 |
| 5,731,880 * | 3/1998 | Takaragi et al. | 358/296 |
| 5,781,653 * | 7/1998 | Okubo | 382/195 |
| 5,790,165 | 8/1998 | Kuboki et al. | 347/251 |
| 5,845,008 * | 12/1998 | Katoh et al. | 382/217 |
| 5,859,651 * | 1/1999 | Potu | 382/300 |
| 5,867,589 * | 2/1999 | Graves et al. | 382/191 |
| 5,909,313 * | 6/1999 | Lee | 359/569 |
| 6,014,453 * | 1/2000 | Sonoda et al. | 382/137 |
| 6,026,186 * | 2/2000 | Fan | 382/202 |

* cited by examiner

METHOD FOR COUNTERFEIT CURRENCY DETECTION USING ORTHOGONAL LINE COMPARISON

FIELD OF THE INVENTION

This invention is generally related to microprocessor based image recognition techniques and, more particularly, to an anti-counterfeit currency detection method using line detection within images.

BACKGROUND OF THE INVENTION

The ability to detect currency patterns in an image can be useful in copier machines or scanners for the purpose of preventing counterfeiting. The challenge of incorporating such a method in current copier or scanning technology is the difficulty with detecting images in a rotation or shift invariant manner. Specifically, the pattern could be of any orientation and at any location of the image. The orientation and the location of the currency or banknote can be relatively simple to estimate in the case of a single note with a plain background; however, it becomes a major obstacle if multiple notes are involved and/or the notes are embedded in some complicated image background.

Examples of skew angle identification and correction are can be found in the following patents:

U.S. Pat. No. 5,528,387 to Kelly et al., issued Jun. 18, 1996, which teaches electronic image registration in a scanner. In particular, the edge data of a document is detected and skew angle calculated. The image is then rotated based upon the skew angle and non-image areas are filled using an image generation feature.

U.S. Pat. No. 4,922,350 to Rombola et al., issued May 1, 1990, discloses a two-pass scanning apparatus for detecting the size and position of an original document on a scanner platen. Image signals captured on a first scan are employed to determine boundaries and a best-fit magnification so that the image may be fir to a recording sheet using image signals generated on a subsequent scanning pass.

U.S. Pat. No. 5,253,765 to Moorehead et al, issued Oct. 19, 1003, teaches a system for sorting randomly sized objects (e.g. mushrooms). Invariant moments are employed, utilizing the complete pixel information for all pixels within the border of a captured image, to extract information about the mushroom size and orientation.

U.S. Pat. No. 5,220,398 to Horn et al. teaches an analog VLSI microchip that uses moments to determine the position and orientation of an object in a scene.

In "Invariant Fitting of Planar Objects by Primitives," published in 1996 IEEE Proceedings of ICPR '96, pp. 508–512 Voss et al, teach a method of pattern recognition using primitives such as triangles, rectangles, circles, ellipses, superquadratics, etc. The author further describe a technique for describing the primitives using moments in a normalized manner; resulting in a decrease in the numerical effort.

In "Managing and Representing Image Workflow in Prepress Applications," Technical Association of the Graphic Arts (TAGA) Vol. 1, 1995 Proceedings, pp. 373–385, Venable et al. teach the use of structured images to manage prepress workflow.

Prior countefeit detection methods rely on point detection during recognition. As disclosed in U.S. Pat. No. 5,533,144 to Fan, entitled "Anti-counterfeit Pattern Detector and Method", an anti-counterfeit detector and method identifies whether a platen image portion to be photocopied contains one or several banknote patterns. With the '144 method, the detection is performed in a rotation and shift invariant manner. Specifically, the pattern can be of any orientation and at any location of the image, and can be embedded in any complicated image background. The image to be tested is processed block by block. Each block is examined to see if it contains an "anchor point" by applying an edge detection and orientation estimation procedure. For a potential anchor point, a matching procedure is then performed against stored templates to decide whether the preselected monetary note patterns are valid once detected.

Other anti-counterfeiting or pattern detection methods are presented by the following patents:

U.S. Pat. No. 4,153,897

Yasuda, et. al.

Issued May 8, 1979

U.S. Pat. No. 5,216,724

Suzuki, et. al.

Issued Jun. 1, 1993

U.S. Pat. No. 5,291,243

Heckman, et. al.

Issued Mar. 1, 1994

Yasuda et al. discloses a pattern recognition system where similarities between unknown and standard patterns are identified. Similarities are detected at first in respective shifting conditions where the unknown and standard patterns are relatively shifted from each other over the first limited extent, including the condition without shift. The maximum value of these similarities is then detected. The similarities are further detected in respective shifting conditions where the unknown and standard patterns are relatively shifted from each other over the second extent larger than the first limited extent, when the shifting condition which gave the maximum value is that without relative shift.

Suzuki et al. discloses an apparatus for image reading or processing that can precisely identify a particular pattern, such as banknotes or securities. A detecting unit detects positional information of an original image and a discriminating unit extracts pattern data from a certain part of the original image to discriminate whether the original image is the predetermined image based on the similarity between the pattern data and the predetermined pattern.

Heckman et al. discloses a system for printing security documents which have copy detection or tamper resistance in plural colors with a single pass electronic printer. a validating signature has two intermixed color halftone patterns with halftone density gradients varying across the signature in opposite directions, but different from the background.

A fundamental problem in electronic image pattern recognition is with line detection, or more generally, curve detection. In a pre-scan image lines might be detected to decide where the edges of a paper document are. Within a document text lines may be used to estimate the skew angle of the document. Also, line and other simple curve detection often serves as the first step for complex object detection, as the contour of a complex object can always be decomposed into simple curves.

Line detection can be done by many standard methods such as that described by A. Rosefield and A. C. Kak in an article entitled "Digital Picture Processing", Academic Press, Inc. In particular, it can be done by Hough Transform, which is probably the most important and most widely-used line detection algorithm.

This disclosure employs line detection to determine the location and orientation of the currency pattern in a manner that has advantages over prior detection methods. The proposed method is more accurate and requires less computation All of the references cited herein are incorporated by reference for their teachings.

SUMMARY OF THE INVENTION

In order to improve the speed and accuracy as discussed above, an electronic image detection method wherein line information is utilized to determine the location and orientation of the currency presented. The anti-counterfeit currency detection method disclosed utilizes line, rather than point, information for detection of counterfeit notes or currency. The use of "Anchor lines" instead of "anchor points" (as disclosed in '144 to Fan) in currency image detection methods are proposed.

A detect or is trained off-line with example notes resulting in a template generated by recording a test pattern similar to a pattern to be tested; anchor lines are identified within the template. The lines are detected during the testing; the template is rotated and shifted before matching the template to the test pattern so that the anchor lines align with long lines detected within the test pattern; and the template and the test pattern are compared to determine whether there is a match.

The method can be carried out in a system comprising having a microprocessor programmed to carry out the above steps of the method. The system's microprocessor facilitates the training of a detector off-line with example notes which are scanned into said system wherein a template is generated by recording an image pattern of the example notes similar to a test pattern to be detected; identifies anchor lines within the template. The lines are detected during the testing; rotates and shifts the template before matching the template to the test pattern so that the anchor lines align with long lines which may be detected within the test pattern; and compares the template to the test pattern to determine whether the anchor lines exist within the test pattern.

Other advantages and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

In order to detect whether a copier is used for counterfeiting, a detector incorporated within the scanning system of the copier is first trained off-line with example notes. A template is created by recording the image pattern of the currency notes or targeted image (test image) to be detected.

Figure 1:
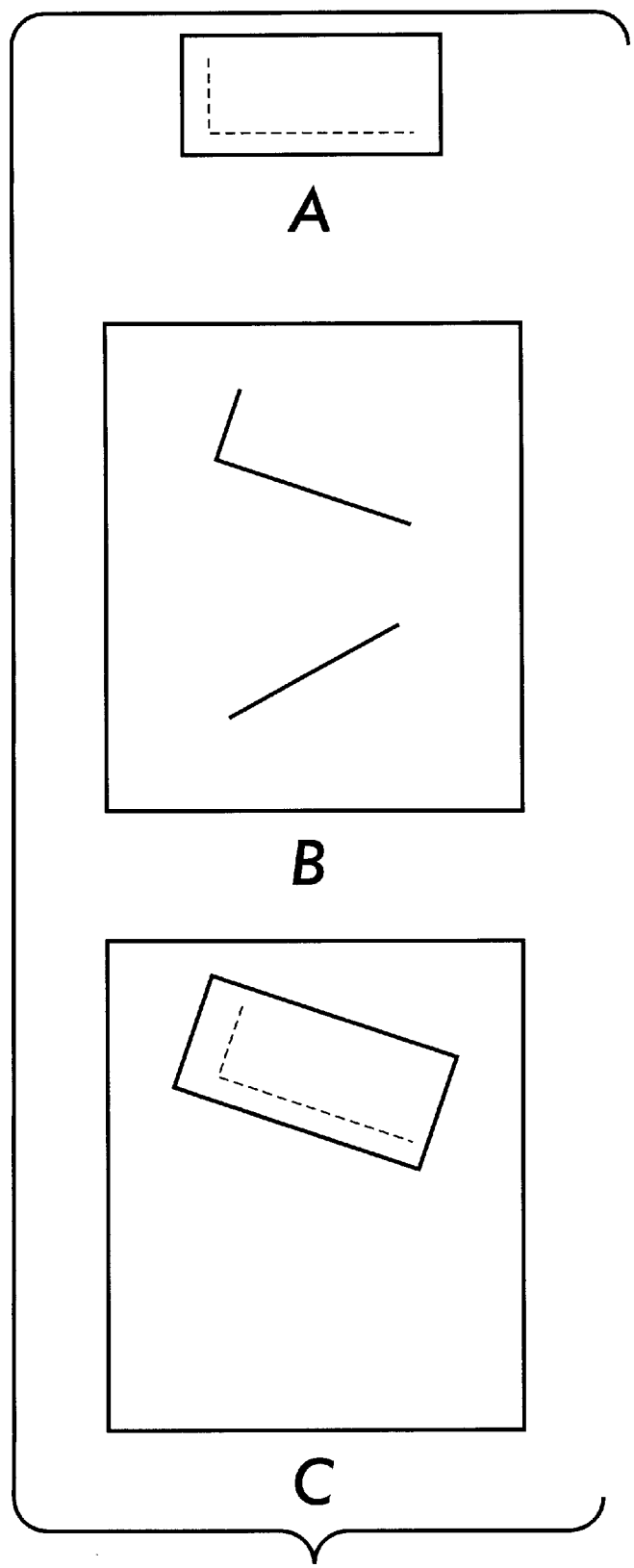
FIG. 1A illustrates a sample template having anchor lines (dashed) which intersect in this sample—forming an "L" shape.
FIG. 1B illustrates anchor lines which may be found in a test image.
FIG. 1C illustrates detection of a legitimate currency after the template (FIG. 1A) is matched with the anchor lines within the image (FIG. 1B)

The training includes generating the templates and selecting one or several pairs of anchor lines. The anchor lines are straight, desirably long lines. They can be either straight lines within the currency pattern, or the currency edges. Each pair contains two lines which are orthogonal to each other in direction. a detector is trained off-line with currency images resulting in a template generated by recording a pattern similar to a test pattern to be sampled; anchor lines are identified within said template In detection, a Hough Transform, or any other standard methods, can be first performed to detect long straight lines. The long lines detected are then grouped into pairs, each of which contains two long lines that are in orthogonal directions. Under the assumption that the detected long line pairs are the anchor line pairs, the test pattern is matched to the templates. FIG. 1A illustrates a sample template. Specifically, the template is first rotated and shifted before matching so that the anchor lines align with the detected long lines to be authenticated. This is best illustrated in FIG. 1B where the anchor lines which are similar to the template are shown in the upper part of the Figure. A legitimate currency pattern is declared to be detected after the template (FIG. 1A) is matched with the anchor lines within the image (FIG. 1B), as shown in FIG. 1C, wherein the template (FIG. 1A), after any necessary rotation and shifting, is overlaid on top of the test pattern anchor lines of FIG. 1B. The test result may then be determined as positive.

Since there are less "long lines" in an image than blocks containing points or edges, the number of pattern matching routines required for match determination is less in the proposed method than that in '144 to Fan. Also, as the long lines contain more information about the line direction than the short edges, orientation estimation is much more accurate. As a result, the reliability of pattern matching is also improved.

Figure 2:
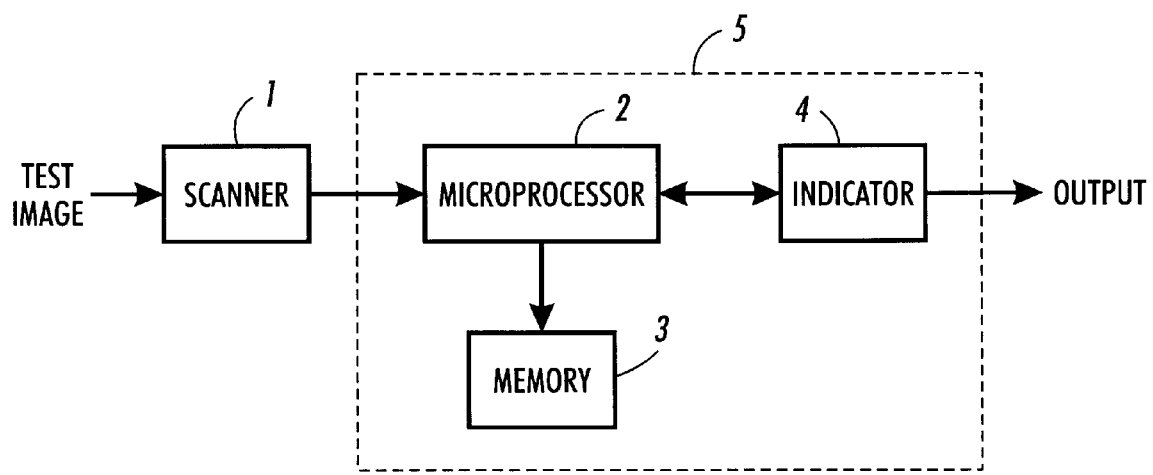
FIG. 2 is a block diagram of the system of the invention.

Referring to FIG. 2, system hardware necessary for the anti-counterfeit detection system 5 would include a scanner 1 for receiving the test image, a microprocessor 2 programmed to detect counterfeit currency by detecting lines in scanned documents, memory 3 for storing test patterns, and an indicator means 4 to indicate counterfeit detection and may further prevent duplication of test patterns which may occur in a larger system (not shown) such as a copier or through a computer. The indicator means 4 would provide an output signal to the larger system indicating the status of the tested image. The anti-counterfeit detection system would facilitate the training of the microprocessor 2 (also referred to as "detector") off-line with notes or currency, which are scanned 1 into said system wherein a template is generated by recording 3 an image pattern of said example notes similar to a test pattern to be detected. Anchor lines within the template, which are further represented in said test pattern, would be identified by the microprocessor 2. The microprocessor system would perform line detection during testing. It will allow for the rotation and shifting of the template before matching it to the test pattern so that anchor lines may align with long lines which may be detected within the test pattern. The system 2 would then compare the template, held in memory 3, to the test pattern that is scanned 1 or viewed by an image capturing means to determine whether the anchor lines exist within the test pattern.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A counterfeit currency detection method using line detection information for determining location and orientation of a predetermined image pattern for matching against a test pattern to be authenticated, comprising the steps of:

training a detector off-line with at least one example currency note wherein at least one template is generated thereby;

identifying at least 1 pair of anchor lines within said generated template wherein each pair of anchor lines contain at least 2 orthogonal lines, said identifying step using edge detection and algorithmic transforms;

rotating and shifting said template so that said anchor lines align with lines detected within said test pattern; and comparing said template to said test pattern to determine whether said anchor lines exist within said test pattern.

2. The method of claim 1 wherein said anchor lines may comprise straight lines representing edges within said test pattern.

3. A counterfeit detection system comprising a microprocessor programmed to:

facilitate the training of a detector off-line with authentic currency documents which are scanned into said system wherein a plurality of templates are generated by recording an image pattern within said authentic currency documents resulting in at least one template wherein said at least one template is stored in a memory;

identify at least 1 pair of anchor lines within said at least one template wherein each pair of anchor lines contain at least 2 orthogonal lines, said identifying step using edge detection and algorithmic transforms;

rotate and shift said at least one template during counterfeit detection operations wherein matching of said at least one template to a scanned test pattern is facilitated so that said anchor lines align with similar lines which may be detected within said test pattern, thereby resulting in alignment; and comparing said at least one template to said test pattern to determine whether said anchor lines exist within said test pattern.

4. The invention of claim 3 further comprising a memory for storing said templates.

5. The invention of claim 3 further comprising a scanner for scanning images into said system.

6. The invention of claim 3 further comprising a indicator means for indicating whether said test pattern is counterfeit based on said comparing.

7. The invention of claim 6 wherein said indicator means provides input to a controller that prevents photocopying or storage of said test pattern.

8. The invention of claim 4 further comprising a scanner for scanning images into said system.

9. The invention of claim 8 further comprising a indicator means for indicating whether said test pattern is counterfeit based on said comparing.

10. The invention of claim 9 wherein said indicator means provides input to a controller that prevents photocopying or storage of said test pattern.

* * * * *